(12) United States Patent
Chen et al.

(10) Patent No.: US 10,012,162 B2
(45) Date of Patent: Jul. 3, 2018

(54) ENGINE AIR SHUT-OFF VALVE SYSTEM

(71) Applicants: Ming Fei Chen, Sugar Land, TX (US); Yanmei Li, Katy, TX (US)

(72) Inventors: Ming Fei Chen, Sugar Land, TX (US); Yanmei Li, Katy, TX (US)

(*) Notice: Subject to any disclaimer, the term of this patent is extended or adjusted under 35 U.S.C. 154(b) by 0 days.

(21) Appl. No.: 15/655,783

(22) Filed: Jul. 20, 2017

(65) Prior Publication Data
US 2017/0314485 A1 Nov. 2, 2017

Related U.S. Application Data

(63) Continuation-in-part of application No. 14/285,625, filed on May 22, 2014, now abandoned.

(51) Int. Cl.
| | |
|---|---|
| *F02D 17/04* | (2006.01) |
| *F02D 9/10* | (2006.01) |
| *F02D 41/04* | (2006.01) |
| *F02D 9/14* | (2006.01) |
| *F02D 31/00* | (2006.01) |
| *F16K 31/56* | (2006.01) |
| *F02D 9/02* | (2006.01) |

(Continued)

(52) U.S. Cl.
CPC ......... *F02D 41/042* (2013.01); *F02D 9/1045* (2013.01); *F02D 9/14* (2013.01); *F02D 17/04* (2013.01); *F02D 31/006* (2013.01); *F02D 2009/0245* (2013.01); *F02M 35/10255* (2013.01); *F16K 3/06* (2013.01); *F16K 31/563* (2013.01)

(58) Field of Classification Search
CPC ..... F16K 3/04; F16K 3/06; F16K 3/10; F16K 3/16; F16K 3/08; F16K 3/085; F02D 17/04; F02D 31/002; F02D 31/006; F02D 2009/0245; F02D 41/0002; F02D 41/042; F02M 35/10255
USPC ......... 123/394, 198 D; 251/61, 11, 113, 301, 251/302, 193, 185
See application file for complete search history.

(56) References Cited

U.S. PATENT DOCUMENTS

| | | |
|---|---|---|
| 4,129,040 A | 12/1978 | Hayden |
| 4,215,845 A | 8/1980 | Sturgeon |
| 4,285,494 A | 8/1981 | Sturgeon |

(Continued)

FOREIGN PATENT DOCUMENTS

GB  1429650 A  3/1976

*Primary Examiner* — Jacob Amick
*Assistant Examiner* — Michael A Kessler
(74) *Attorney, Agent, or Firm* — Andrew W. Chu; Craft Chu PLLC (57) ABSTRACT

The engine shut-off valve system includes a housing, a gate member, a rotating lever, a locking piston assembly, and a closing piston assembly. The system is installed in fluid connection with a flow line so that air flow passes through a passageway in the housing with the gate member in the locked configuration. The air flow through the passageway stops with the gate member in the closed configuration. The gate member has an asymmetry so that the forces of the spring of the closing piston assembly and the spring of the locking piston assembly are cooperative to actuate between the closed configuration and the locked configuration, while wearing on the gate member differently so as to extend the working life of the valve system. The closing piston assembly and the locking piston assembly are separately accessible for maintenance.

20 Claims, 3 Drawing Sheets

(51) Int. Cl.
*F02M 35/10* (2006.01)
*F16K 3/06* (2006.01)

(56) References Cited

U.S. PATENT DOCUMENTS

| | | | |
|---|---|---|---|
| 4,381,100 A * | 4/1983 | Schoenberg | F16K 3/188 |
| | | | 137/554 |
| 4,501,238 A | 2/1985 | Odom | |
| 4,537,386 A | 8/1985 | Krepela | |
| 4,546,954 A | 10/1985 | Bodnar | |
| 5,203,536 A | 4/1993 | Krepela | |
| 5,205,252 A | 4/1993 | Krepela | |
| 6,273,053 B1 | 8/2001 | Krepela | |
| 2013/0068984 A1 * | 3/2013 | Molavi | F16K 31/563 |
| | | | 251/336 |

* cited by examiner

ENGINE AIR SHUT-OFF VALVE SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to valves. More particularly, the present invention relates an engine air shut-off valve. Even more particularly, the present invention relates to a valve system with separate and independent locking and closing mechanisms.

2. Description of Related Art Including Information Disclosed Under 37 CFR 1.97 and 37 CFR 1.98

Engine air shut-off valves prevent combustible gas or vapors from improperly entering the engine air intake system. The most common method of engine shut-off is by terminating the air supply that provides oxygen to engine combustion. It is critical to have an air shut-off valve installed as a safety device that allows control over the operation of an engine as well as prolong the engine life.

Engine shut-off valves with reciprocating gates are disclosed in U.S. Pat. No. 4,215,845, U.S. Pat. No. 4,546,954, U.S. Pat. No. 4,285,494, U.S. Pat. No. 4,501,238, U.S. Pat. No. 5,203,536, U.S. Pat. No. 5,205,252, and U.S. Pat. No. 6,273,053.

U.S. Pat. No. 4,546,954 issued to Bodnar, British Patent GB 129650 issued to Curran, U.S. Pat. No. 4,537,386 issued to Krepela, and U.S. Pat. No. 4,129,040 issued to Hayden, were also disclosed in the field of shut-off valves.

It is an object of the present invention to provide an engine shut-off valve system with the closing mechanism independent from the locking mechanism.

It is another object of the present invention to provide an engine shut-off valve system with the closing mechanism aligned on a different axis from the locking mechanism.

It is another object of the present invention to provide an engine shut-off valve system with the closing mechanism not aligned with the locking mechanism.

It is still another object of the present invention to provide an engine shut-off valve system with the closing mechanism and the locking mechanism separately accessible.

It is an object of the present invention to provide an engine shut-off valve system with an asymmetric gate member.

It is another object of the present invention to provide an engine shut-off valve system with the closing mechanism closer to the pivot point of the gate member than the locking mechanism.

BRIEF SUMMARY OF THE INVENTION

The engine shut-off valve system of the present invention comprises a housing, a gate member, a rotating lever, a locking piston assembly, and a closing piston assembly. The system is installed in fluid connection with a flow line to pass an air flow through the passageway of the housing with the gate member in the locked configuration and to stop the air flow through the passageway with the gate member in the closed configuration. The rotating lever actuates the gate member at a pivot point between a closed configuration and a locked configuration.

The housing includes a first half with a first opening and a second half with a second opening. The first opening and the second opening form a passageway through the housing. In some embodiments, a first flange is removably attached to the first opening of the first half, and a second flange is removably attached to the second opening of the second half. The first flange and the second flange are cooperative with installations for engines so that the air flow can be in fluid connection with the passageway.

Embodiments of the present invention include the gate member being comprised of a first end portion with a hole having a pivot point, a second end portion connected to the first end portion, and a gate latch being a protrusion from the second end portion. The first end portion extends radially from the second end portion so as to define a first radius from the center gate axis to the pivot point. The gate latch extends radially from the second end portion at a second radius from the center gate axis. The second radius is different from the first radius and an opposite radius of the first radius. The second end portion is generally circular and larger than the first end portion. In some embodiments, there are seals on the faces of the gate member so that the gate member can make a fluid tight sealing connection to the first opening and the second opening in the housing. The passageway can be sealed in the closed configuration of the gate member.

The rotating lever of the present invention can have an action end outside of the housing and an inserted end fixed within the housing by a snap ring. The rotating lever is fixed to the pivot point of the gate member. The inserted end has a lever portion extending through the hole of the first end portion such that the rotating lever has a rotating lever axis aligned with the rotational axis of the pivot point of the gate member. The rotating lever can rotate the gate member by turning the action end outside of the housing.

Embodiments of the present invention include a locking piston assembly comprising a cylinder, a spindle, a pull handle, and a locking compression spring. The cylinder contains the spindle and locking compression spring, and the cylinder is inserted into a housing opening so that the spindle can engage the gate latch of the gate member. The internal end of the spindle engaging the gate latch is the locking piston. In some embodiments, the locking piston is comprised of a head portion, a chamfer aligned with the gate latch, and a stop member mounted on the head portion. The chamfer initially engages the gate latch, until the gate latch is rotated past the head portion for a locked configuration. The stop member holds rotational position of the spindle relative to the cylinder.

The present invention further includes a closing piston assembly made integral with the housing. There is a closing chamber as part of the housing, a clevis extending through the closing chamber and having an attachment end with clevis holes and an anchor end opposite the attachment end, a clevis pin mounted on the proximal end of the first end portion of the gate member between the second end portion and the rotating lever, and a closing compression spring. The clevis pin inserts through the gate member and the clevis holes on the attachment end so that the gate member is in rotatable engagement with the rotating lever at the lever portion and with the clevis at the clevis pin.

In embodiments of the present invention, the gate member of the valve system has a closed configuration with the passageway being in a closed configuration and a locked configuration with the passageway being in an opened configuration. In the closed configuration, the closing compression spring is extended, and the locking compression spring is extended because the locking piston is not even engaged with the gate latch in this closed configuration. The force of the closing compression spring holds the gate member in the closed configuration. In the locked configuration, the gate latch is friction fit against the locking piston, the closing compression spring is compressed, and the locking compression spring is extended. The force of the locking compression spring holds the locking piston so that the gate member is held in the opened configuration.

The gate member is rotatable at the pivot point, back and forth between the closed configuration and the locked configuration. The rotating lever actuates the gate member from the closed configuration to the locked configuration against a force of the closing compression spring until the locking piston is friction fit against the gate latch. The clevis and closing compression spring rotate the gate member from the locked configuration to the closed configuration by the force of the closing compression spring, when the pull handle releases the gate latch from the locking piston by compressing the locking compression spring.

The locking piston assembly and the closing piston assembly are separately accessible for maintenance and repair. The locking piston assembly has a removable cylinder insertable into the housing opening, and the closing piston assembly can have the closing chamber being comprised of an end cap and a plurality of end cap screws. The positions of the closing chamber and housing opening on the housing are independent from each other, such that repairing one can occur without dismantling the other. For example, when the closing piston assembly further comprises a rotating lock nut mounted around the clevis on the distal spring end, the closing chamber can be accessed to adjust the position of the rotating lock nut relative to the clevis. Since the position of the rotating lock nut can determine the force of the closing compression spring, the closing piston assembly can be adjusted to extend the working life of the valve system.

DETAILED DESCRIPTION OF THE INVENTION

Referring to FIGS. 1-6, the engine shut-off valve system 1 regulates air flow. In particular, the valve system 1 controls air flow to an engine intake. The valve system 1 allows for stopping air flow as soon as safety conditions require. The valve system 1 can be operated by electrical, pneumatic, hydraulic or even manual means, and the valve system 1 is compatible with sensors along the flow path of the air flow. Whenever the sensors, such as an accelerometer, noise detector, chemical detector, and thermometer, detect certain conditions in the air flow, the valve system 1 can be triggered to open and allow air flow or to close and stop air flow. Embodiments of the valve system 1 include a housing 10, a gate member 50, a rotating lever 100, a locking piston assembly 120, and a closing piston assembly 160.

Figure 1:
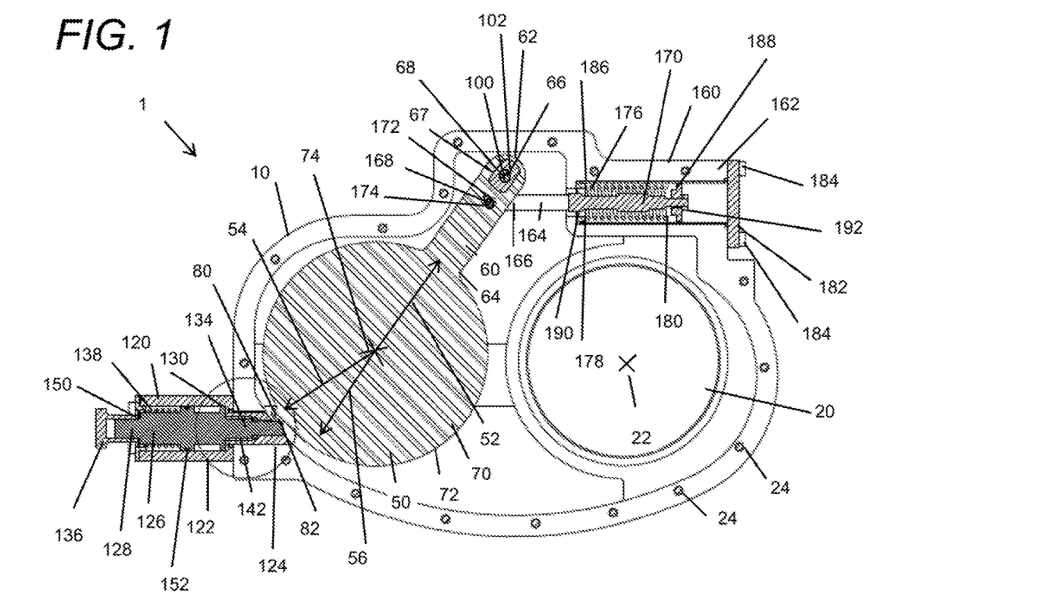
FIG. 1 is a longitudinal sectional view of an embodiment of the valve system of the present invention, showing the locked configuration of the gate member.
Figure 2:
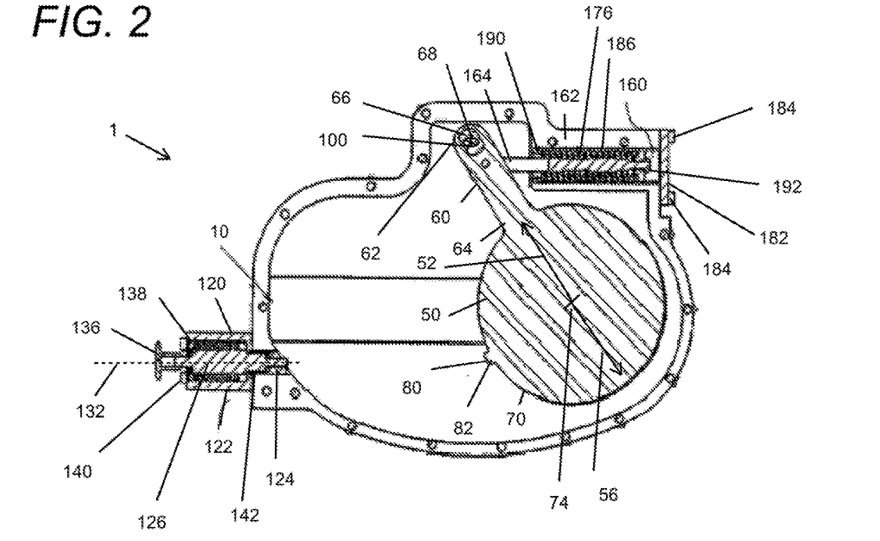
FIG. 2 is a longitudinal sectional view of an embodiment of the valve system of the present invention, showing the closed configuration of the gate member.
Figures 3, 4, 5, 6:
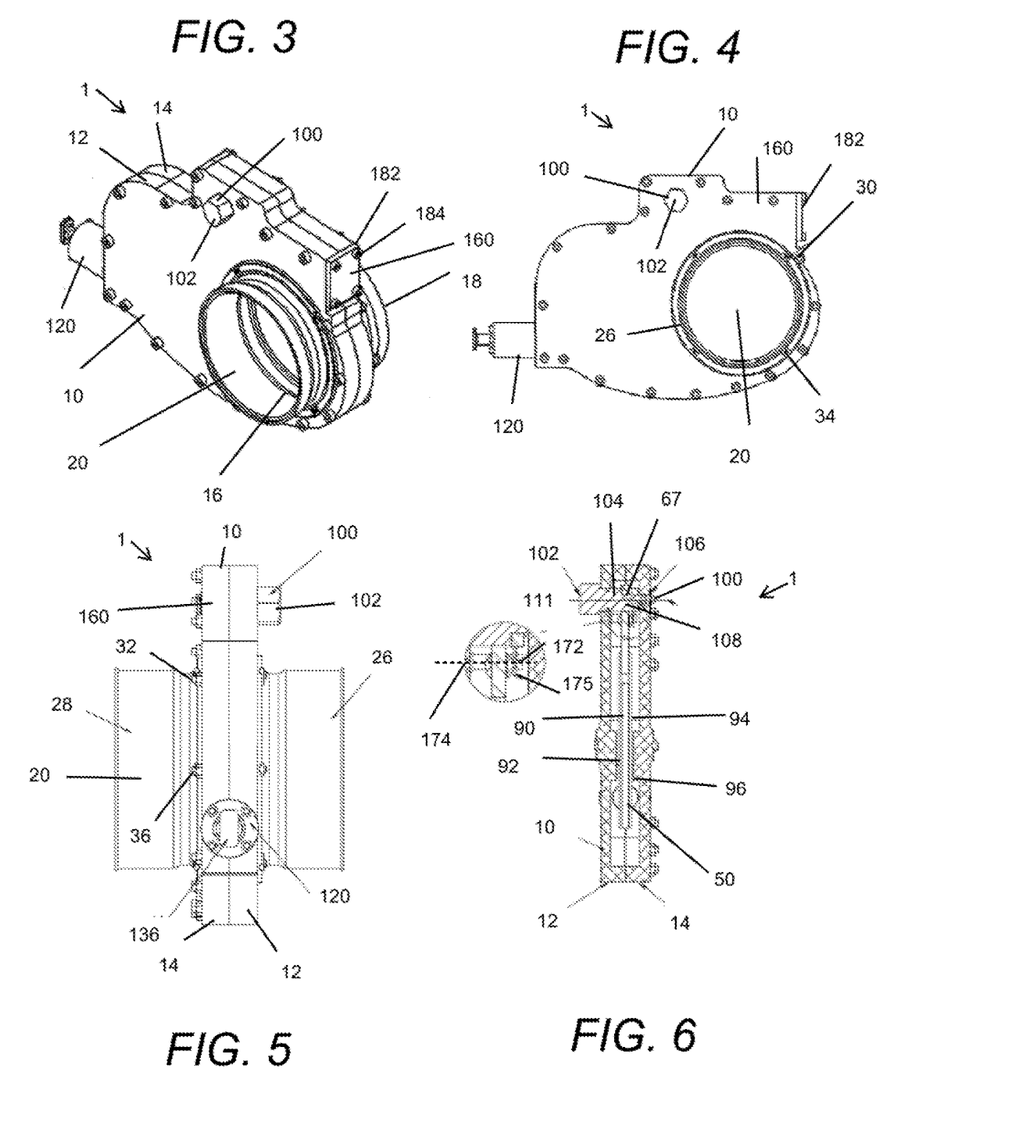
FIG. 3 is an upper perspective view of an embodiment of the valve system of the present invention.
FIG. 4 is a side elevation view of an embodiment of the valve system of the present invention, according to FIG. 3.
FIG. 5 is an end elevation view of another embodiment of the present invention, showing flanges attached to the housing.
FIG. 6 is a cross-sectional view of an embodiment of the valve system of the present invention and an isolated enlarge sectional view of an embodiment of the rotating lever.

Embodiments of the housing 10 are shown in FIGS. 1-6. The housing 10 is comprised of a first half 12 and a second half 14. Each of the halves has a corresponding opening. The first half 12 has a first opening 16, and the second half 14 has a second opening 18, as shown in FIG. 3. The first opening 16 and the second opening 18 form a passageway 20 through the housing 10. When the first half 12 is fixedly attached to the second half 14, the passageway 20 can be defined by the first opening 16 and the second opening 18. FIGS. 1-6 show the passageway 20 as being generally circular with a center passageway axis 22. Air flow passes through the system 1 through this passageway 20, when the gate member 50 is not obstructing the passageway 20. In FIGS. 1-5, there is an embodiment with a plurality of cap screws 24 fixedly attaching the first half 12 to the second half 14. In FIGS. 4-5, there is another embodiment with a first flange 26 removably attached to the first opening 16 of the first half 12, and a second flange 28 removably attached to the second opening 18 of the second half 14. The flanges 26, 28 can be attached by conventional hardware, such respective locking pins 30, 32 and set screws 34, 36, as shown in FIGS. 4 and 5. The first flange 26 and the second flange 28 can be cooperative with installations for engines, when the system 1 is incorporated into other systems.

FIGS. 1-2 show embodiments of the gate member 50 in the closed configuration (FIG. 2) and the locked configuration (FIG. 1). The gate member 50 is comprised of a first end portion 60 having a proximal end 62 with a hole 67 having a pivot point 66 and a distal end 64 opposite the proximal end, a second end portion 70 being made integral with the distal end 64 of the first end portion 60, and a gate latch 80 extending radially from the second end portion 70. The pivot point 66 determines a rotational axis 68 of the gate member 50, so that the gate member 50 rotates back and forth between the closed configuration and the locked configuration at the pivot point 66. The second end portion 70 is larger than the first end portion 60. FIGS. 1-2 show embodiments of the second end portion 70 being comprised of a circular body 72 with a center gate axis 74. The first end portion 60 extends radially from the second end portion 70 so as to define a first radius 52 from the center gate axis 74 to the pivot point 66. The gate latch 80 is comprised of a protrusion 82 set at a second radius 54 from the center gate axis 74, and the second radius 54 is different from the first radius 52 and an opposite radius 56 of the first radius 52. The second radius 54 is not aligned so that the gate member 50 has asymmetry. This relationship of the gate latch 80 and the first end portion 60 set the positions of the closing piston assembly 160 and the locking piston assembly 120 in the system 1. The gate latch 80 as a protrusion 82 provides contact area between the locking piston assembly 120 and the gate member 50. Unlike a recess into the second end portion 70, a protrusion 82 avoids wear and can have a longer operating life.

An alternative embodiment of FIG. 6 shows the gate member 50 with a first seal 90 on one face 92 of the second end portion 70 aligned with the first half 12, and a second seal 94 on an opposite face 96 of the second end portion 70 aligned with the second half 14. This embodiment can form a fluid tight seal so that the air flow stops flowing through the system 1. The first seal 90 is in sealed engagement with the first opening 16, and the second seal 94 is in sealed engagement with the second opening 16 in the closed configuration of the gate member 50. The gate member 50 can be more than an obstacle to air flow through the passageway 20.

Embodiments of the rotating lever 100 are shown generally in FIGS. 1-5 and more particularly in FIG. 6. The rotating lever 100 extends through the first half 12 and the second half 14 of the housing 10 in FIG. 6. The rotating lever 100 is fixedly engaged to the pivot point 66 of the gate member 50, such that the rotating lever 100 has a rotating lever axis 111 aligned with the rotational axis 68 of the gate member 50 by the pivot point 66. When the rotating lever 100 rotates, the gate member 50 rotates. The rotating lever 100 can be powered by hydraulic, electronic, pneumatic or other mechanical means, including manual, in order to rotate the gate member 50. The embodiment of FIG. 6 shows the rotating lever 100 comprised of an action end 102 outside of the housing 10 (also seen in FIGS. 3-5) and an inserted end 104 extending through the housing 10. The inserted end 104 can have an extended portion with a snap ring 106 and a lever portion 108. The lever portion 108 extends through the hole 67 of the gate member 50 to align the rotating lever axis 111 with the pivot point 66. The extended portion passes through to the other side of the housing 10. The snap ring 106 holds the extended portion of the inserted end 104 outside of the housing 10 as shown in FIG. 6. The lever portion 108 extends through hole 67 with the pivot point 66 for rotating engagement of the gate member 50 to the rotating lever 100 at the lever portion 108.

Figure 8:
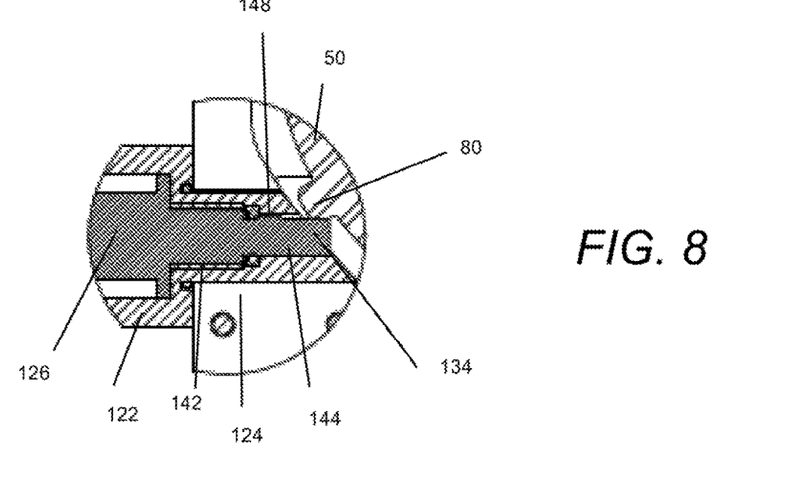
FIG. 8 is a partial longitudinal sectional view of the spindle engaging the gate latch, according to FIG. 7.

The valve system 1 also includes the locking piston assembly 120 attached to the housing 10, as shown in FIGS. 1-6 and 8. The locking piston assembly 120 can be comprised of a cylinder 122 removably engaged to the housing 10 through a housing opening 124 in the housing 10, a spindle 126 extending through the cylinder 122, a pull handle 136 fixedly attached to the spindle 126, and a locking compression spring 138. FIGS. 1-2 and 8 show the spindle 126 having an external end 128 outside of the cylinder 122 and an internal end 130 inserted through the housing opening 124 and into the housing 10. The spindle 126 extends longitudinally along a spindle axis 132, and the internal end 130 has a locking piston 134. The external end 128 attaches to the pull handle 136, and internal end 130 has the locking piston 134 being removably engaged to the gate latch 80. The spindle 126 inserts through the locking compression spring 138, such that the locking compression spring 138 is also aligned along the spindle axis 132.

Figure 7:
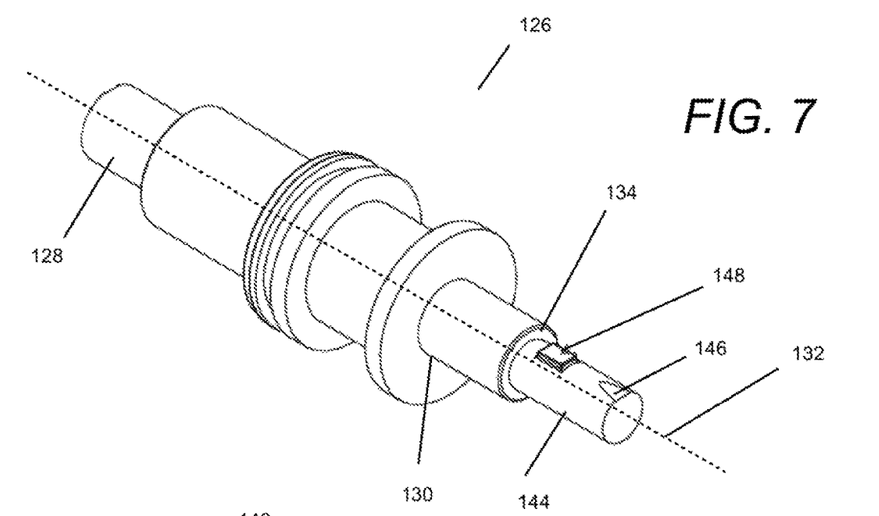
FIG. 7 is a perspective view of an embodiment of the spindle of the locking piston assembly, according to the present invention.

Embodiments of the locking piston assembly 120 include components to control the compression and extension of the locking compression spring 138. FIGS. 1-2 show a plurality of screws 140 fixedly attaching the cylinder 122 to the housing 10, and there can be an inner bushing 142 in the housing 10 adjacent the housing opening 124. The internal end 130 inserts through the inner bushing 142 to reach the gate latch 80. FIGS. 7-8 show an alternative embodiment of the spindle 126 comprised of a head portion 144, a chamfer 146 aligned with the gate latch 80, and a stop member 148 mounted on the head portion 144. The chamfer 146 is in removable engagement with the gate latch 80. As the gate latch 80 engages the head portion 144 and continues to rotate, the gate latch 80 reaches the edge of the chamfer 146 in order to slide past the locking piston 134. The stop member 148 is in friction fit engagement with the cylinder 122 to prevent the spindle 126 from rotating within the cylinder 122. The stop member 148 holds rotational position of the spindle 126 around the spindle axis 132 relative to the cylinder 122. FIG. 1 shows additional components for setting the locking compression spring 138 relative to the cylinder 122. There is a wiper seal 150 mounted between the locking compression spring 138 and the cylinder 122 at the external end 128 of the spindle 126. There is a U-cup seal 152 mounted between the cylinder 122 and the spindle 126 and the inner bushing 142 in the housing opening 124. The locking compression spring 138 engages the wiper seal 150 to the cylinder 122 in both the extended configuration and the compressed configuration of the locking compression spring 138. The U-cup seal 152 maintains the seal between the cylinder 122 and the spindle 126 in both the locked configuration and the closed configuration of the gate member 50. Additionally, the U-cup seal 152 maintains the seal during actuation of the pull handle 136 for the release of the locking piston 134 from the gate latch 80, when the locked configuration returns to the closed configuration.

Embodiments of the closing piston assembly 160 are shown in FIGS. 1-2, although FIGS. 3-6 also show the closing piston assembly 160 being made integral with the housing 10. The sectional views of FIGS. 1-2 further show the closing piston assembly 160 being comprised of a closing chamber 162 being made integral with the housing 10, a clevis 164 extending through the closing chamber 162, a clevis pin 172 mounted on the first end portion 60 of the gate member 50, and a closing compression spring 176. The clevis 164 has an attachment end 166 with clevis holes 168 and an anchor end 170 opposite the attachment end 166. FIG. 1 shows the overlap of the clevis holes 168, the clevis pin 172, and the clevis axis 174 of the clevis pin 172 because the clevis pin 172 (see FIG. 6) inserts through the clevis holes 168 and gate member 50. Thus, the clevis pin 172 is connected to the proximal end 62 of the first end portion 60 of the gate member 50 between the second end portion 70 and the rotating lever 100. The clevis axis 174 is the pivot for the clevis 164 relative to the gate member 50, wherein the translational movement of the clevis 164 by the closing compression spring 176 corresponds to rotation of the gate member 50 at the pivot point 66. The gate member 50 is now in rotatable engagement with the rotating lever 100 at the pivot point 66 and with the clevis 164 at the clevis pin 172. The clevis 164 inserts through the closing compression spring 176 to match the alignment along the clevis 164. The closing compression spring has a proximal spring end 178 and a distal spring end 180.

Similar to the locking piston assembly 120, embodiments of the closing piston assembly 160 include components to control the compression and extension of the closing compression spring 176. FIGS. 1-4 show the closing chamber 162 further comprising an end cap 182 and a plurality of end cap screws 184. The end cap screws 184 attach the end cap 182 to the housing 10 and allow access to the closing piston assembly 160 separate from the locking piston assembly 120. FIGS. 1-2 also show an embodiment with a spring sleeve 186 mounted around the clevis 164 and adjacent the proximal spring end 178 of the closing compression spring 176 and a retainer 188 mounted around the clevis 164 at the anchor end 170 and adjacent to the distal spring end 180 of the closing compression spring 176. The closing piston assembly 160 includes a sleeve stop 190 made integral with the housing 10 and adjacent the spring sleeve 186. In the locked configuration of the gate member 50, the closed compression spring 176 is in a compressed configuration, according to FIG. 1. The proximal spring end 178 engages the spring sleeve 186, and the spring sleeve 186 abuts the sleeve stop 190 of the housing 10. The distal spring end 180 engages the retainer 188, while the retainer 188 is pulled through the closing chamber 162 by the anchor end 170 of the clevis 164. In the closed configuration of the gate member 50, the closed compression spring 176 is in an extended configuration, according to FIG. 2. The proximal spring end 178 still engages the spring sleeve 186, the spring sleeve 186 still abuts the sleeve stop 190, and the distal spring end 180 still engages the retainer 188. Now, in the closed configuration, the anchor end 170 of the clevis 164 has placed the retainer 188 furthest from the sleeve stop 190. The force of the closing compression spring 176 holds the retainer 188, and thus holds the clevis 164 in position to hold rotation of the gate member 50 in the closed configuration. FIG. 6 shows the clevis snap ring 175 attached to the clevis pin 172 at the attachment end 170 of the clevis 164. The clevis snap ring 175 locks the clevis 164 to the gate member 50 so that the clevis pin 172 cannot withdraw. The gate member 50 is now rotatable at the clevis axis 174.

In another embodiment of the closing piston assembly 160, there can be a rotating lock nut 192 mounted around the clevis 164 on the anchor end 170, as shown in FIGS. 1-2. The position of the rotating lock nut 192 on the clevis 164 sets the position of the retainer 188 so the force of the closing compression spring 176 can be adjusted as the system 1 wears. If the closing compression spring 176 weakens so that the closing compression spring 176 in the extended configuration cannot hold the gate member 50 in the closed configuration, then the rotating lock nut 192 can be moved further from the anchor end 170. The closing compression spring 176 can now hold this position with the gate member 50 in the closed configuration better than the previous position. When the closing chamber 162 is comprised of an end cap 182 and a plurality of end cap screws 184, the rotating lock nut 192 can be accessible through the end cap 182 without affecting the locking piston assembly 120.

FIG. 2 shows the gate member 50 in the closed configuration. The center gate axis 74 is aligned with the center passageway axis 22, so the passageway 20 is in a stopped configuration. Air flow will not pass the valve system 1. The closing compression spring 176 is in an extended configuration. The locking compression spring 138 can also be in an extended configuration, but the locking piston 134 is not engaged to the gate member 50. The gate member 50 is held in the closed configuration by the closing compression spring 176 without relation to the locking compression spring 138.

FIG. 1 shows the gate member 50 in the locked configuration. The passageway 20 is in an opened configuration, so air flow passes through the valve system 1. The gate latch 80 is friction fit against the locking piston 134 so that the gate member 50 cannot move or rotate. The closing compression spring 176 is in a compressed configuration, and the locking compression spring 138 is in an extended configuration. The gate member 50 is held in the locked configuration by a force of the locking compression spring 176 against a force of the closing compression spring 176 trying to extend.

In the present invention, the gate member 50 is rotatable at the pivot point 66, back and forth between the closed configuration and the locked configuration. From the closed configuration to the locked configuration, the rotating lever 100 rotates the gate member a force of the closing compression spring 176 until the locking piston 134 is friction fit against the gate latch 80. The rotating lever 100 can be automated or manual, and the power of the rotating lever 100 may be pneumatic, hydraulic, electric or any known means. From the locked configuration to the closed configuration, the pull handle 136 releases the gate latch 80 from the locking piston 134 by compressing the locking compression spring 138, similar to a triggering mechanism. Once released, the force of the closing compressing spring 176 pushes the clevis 164 to rotate the gate member 50 back into the closed configuration. Similar to the rotating lever 100, the pull handle 136 can be automated or manual, and the power of the pull handle 136 may be pneumatic, hydraulic, electric or any known means.

Embodiments of the present invention include the method for actuating an engine shut-off valve system 1. The method includes assembling the housing 10, the gate member 50, the rotating lever 100, the locking piston assembly 120, and the closing piston assembly 160, as a valve system 1, and installing the passageway 20 in fluid connection with a flow line. The flow line can be an engine air intake or other air flow system that requires a valve. An air flow passes through the flow line and the passageway 20 with the gate member 50 in the locked configuration, and the method further includes stopping the air flow through the passageway 20 with the gate member 50 in the closed configuration. The method further includes rotating the gate member 50 at the pivot point 66 with the rotating lever 100 from the closed configuration back to the locked configuration and releasing the gate latch 80 from the locking piston 134 to trigger the closing compression spring 176 to return the gate member 50 to the closed configuration.

In valve systems 1 with a spindle 126 having the locking piston 134 comprised of a head portion 144, a chamfer 146 aligned with the gate latch 80, and a stop member 148 mounted on the head portion 144. The stop member 148 is also in friction fit engagement with the cylinder 122 to hold rotational position of the spindle 126 around the spindle axis 132 relative to the cylinder 122. The method further comprising the steps of engaging the chamfer 146 with the gate latch 80, rotating the gate latch 80 past the chamfer 146, and locking the gate latch 80 against the head portion 144 for friction fit engagement of the locking piston 134 with the gate member 50.

In valve systems 1 with the closing piston assembly 10 further comprised of a rotating lock nut 192 mounted around the clevis 164 on the distal spring end 180, the method further comprises setting a position of the rotating lock nut relative to the clevis 164 so as to adjust strength of the closing compression spring 176. In some embodiments with the closing chamber 12 having an end cap 182 and a plurality of end cap screws 184, the method further comprises opening the end cap 182 and accessing the rotating lock nut 192.

The engine shut-off valve system of the present invention includes a closing piston assembly independent from the locking piston assembly. The closing piston assembly and the locking piston assembly are placed in different locations on the housing and can be accessed separately to replace parts and perform maintenance. Repairing one assembly does not require accessing the other assembly. The end caps of the closing piston assembly, and the pull handle at the cylinder of the locking piston assembly are separate. The relationship between the closing piston assembly and the locking piston assembly provide more flexibility for installations with different space and orientation requirements. The valve system can be placed at different angles and allow for different access options to the cylinder or the closing chamber.

Additionally, the engine shut-off valve system of the present invention has an asymmetry in the gate member to enable the relationship between the closing piston assembly and the locking piston assembly. The second radius 54 of the gate latch 80 is not aligned with the first radius 52 or opposite radius 56 of the first end portion 60. The alignment of the clevis pin and pivot point to the center gate axis is different from the gate latch to the center gate axis. Thus, the gate member is asymmetric along the diameter across the gate member and aligned with the pivot point of the first end portion. The locking piston assembly is now positioned at the gate latch, not the clevis of the closing piston assembly. The closing piston assembly is closer to the pivot point of the gate member than the locking piston assembly. These relationships support the functionality and adjustability of the system to accommodate different installations and extend working life of the components.

As described herein, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

The foregoing disclosure and description of the invention is illustrative and explanatory thereof. Various changes in the details of the illustrated structures, construction and method can be made without departing from the true spirit of the invention.

We claim:

1. An engine shut-off valve system, comprising:
   a housing being comprised of a first half and a second half, said first half being comprised of a first opening, said second half being comprised of a second opening, wherein said first opening and said second opening form a passageway through said housing, when said first half is fixedly attached to said second half, said passageway being defined by said first opening and said second opening, said passageway being circular with a center passageway axis;
   a gate member being comprised of:
      a first end portion having a proximal end with hole having a pivot point and a distal end opposite said proximal end, said pivot point determining a rotational axis of said gate member;
      a second end portion being made integral with said distal end of said first end portion, said second end portion being larger than said first end portion, said second end portion being comprised of a circular body with a center gate axis, said first end portion extending radially from said second end portion so as to define a first radius from said center gate axis to said pivot point; and
      a gate latch extending radially from said second end portion at a second radius from said center gate axis, said second radius being different from said first radius and an opposite radius of said first radius, said gate latch being a protrusion from said second end portion;
   a rotating lever extending through said first half and said second half of said housing and being fixedly engaged to said pivot point, said rotating lever having a rotating lever axis aligned with said rotational axis of said gate member by said pivot point;
   a locking piston assembly attached to said housing, said locking piston assembly being comprised of:
      a cylinder removably engaged to said housing through a housing opening in said housing;
      a spindle extending through said cylinder and having an external end outside of said cylinder and an internal end inserted through said housing opening and into said housing, said spindle extending longitudinally along a spindle axis, said internal end having a locking piston, said locking piston being removably engaged to said gate latch;
      a pull handle fixedly attached to said external end of said spindle; and
      a locking compression spring, said spindle inserted through said locking compression spring, said locking compression spring being aligned along said spindle axis; and
   a closing piston assembly being made integral with said housing, said closing piston assembly being comprised of:
      a closing chamber being made integral with said housing;
      a clevis extending through said closing chamber and having an attachment end with clevis holes and an anchor end opposite said attachment end;
      a clevis pin connected to said proximal end of said first end portion of said gate member between said second end portion and said rotating lever, said clevis pin having a clevis axis and inserting through said clevis holes on said attachment end, said gate member being in rotatable engagement with said rotating lever at said pivot point and with said clevis at said clevis pin; and
      a closing compression spring, said clevis inserted through said closing compression spring, said closing compression spring being aligned along said clevis, said closing compression spring having a proximal spring end and a distal spring end,
   wherein said gate member has a closed configuration, said center gate axis being aligned with said center passageway axis, said passageway being in a stopped configuration, said closing compression spring being in an extended configuration, said locking compression spring being in an extended configuration, said gate member being held in said closed configuration by said closing compression spring, wherein said gate member has a locked configuration, said passageway being in an opened configuration, said gate latch being friction fit against said locking piston, said closing compression spring being in a compressed configuration, said locking compression spring being in an extended configuration, said gate member being held in said locked configuration by a force of said locking compression spring against a force of said closing compression spring, and wherein said gate member is rotatable at said pivot point, back and forth between said closed configuration and said locked configuration, said gate member being rotated by said rotating lever from said closed configuration to said locked configuration against a force of said closing compression spring until said locking piston is friction fit against said gate latch, said gate member being rotated by said clevis from said locked configuration to said closed configuration by said force of said closing compression spring, when said pull handle releases said gate latch from said locking piston by compressing said locking compression spring.

2. The valve system, according to claim 1, further comprising:
a plurality of cap screws fixedly engaging said first half to said second half.

3. The valve system, according to claim 1, further comprising:
a first flange removably attached to said first opening of said first half; and
a second flange removably attached to said second opening of said second half, wherein a respective locking piston, and set screw, attach said first flange to said first opening and said second flange to said second opening.

4. The valve system, according to claim 1, further comprising
a first seal on one face of said second end portion aligned with said first half; and
a second seal on an opposite face of said second end portion aligned with said second half,
wherein said first seal is in sealed engagement with said first opening, said second seal being in sealed engagement with said second opening in said closed configuration of said gate member.

5. The valve system, according to claim 1, wherein said rotating lever is comprised of an action end outside of said housing and an inserted end extending through said housing, said inserted end having an extended portion with snap ring and a lever portion, said extended portion having a snap ring and passing through said housing, said snap ring being fixed onto said extended portion outside of said housing, said lever portion extending through said hole of said first end portion at said pivot point, said gate member being in rotating engagement to said rotating lever at said lever portion.

6. The valve system, according to claim 1, wherein said locking piston assembly further comprises:
a plurality of screws fixedly attaching said cylinder to said housing; and
an inner bushing in said housing adjacent said housing opening, said internal end inserting through said inner bushing.

7. The valve system, according to claim 1, wherein said locking piston is comprised of a head portion, a chamfer aligned with said gate latch, and a stop member mounted on said head portion, said chamfer in removable engagement with said gate latch, said stop member being in friction fit engagement with said cylinder, said stop member holding rotational position of said spindle around said spindle axis relative to said cylinder.

8. The valve system, according to claim 1, wherein said locking piston assembly further comprises:
a wiper seal mounted between said locking compression spring and said cylinder at said external end of said spindle; and
a U-cup seal mounted between said cylinder and said spindle in said housing opening.

9. The valve system, according to claim 8, wherein said U-cup seal maintains a sealed relationship between said spindle and said cylinder in said locked configuration and said closed configuration of said gate member.

10. The valve system, according to claim 1, wherein said closing chamber further comprises an end cap and a plurality of end cap screws, said end cap screws attaching said end cap to said housing.

11. The valve system, according to claim 1, wherein said closing piston assembly further comprises:
a spring sleeve mounted around said clevis and adjacent said proximal spring end of said closing compression spring;
a retainer mounted around said clevis at said anchor end and adjacent to said distal spring end of said closing compression spring;
a sleeve stop made integral with said housing and adjacent said spring sleeve; and
a clevis snap ring on said clevis pin at said attachment end of said clevis.

12. The valve system, according to claim 1, wherein said closing piston assembly further comprises:
a rotating lock nut mounted around said clevis on said distal spring end, wherein position of said rotating lock nut relative to said clevis determines said force of said closing compression spring.

13. The valve system, according to claim 10, wherein said closing chamber further comprises an end cap and a plurality of end cap screws, said end cap screws attaching said end cap to said housing, said rotating lock nut being accessible through said end cap.

14. The valve system, according to claim 11, wherein said proximal spring end engages said spring sleeve, said spring sleeve abuts said sleeve stop, and said distal spring end engages said retainer, in said closed configuration, said retainer being positioned by said anchor end of said clevis, said closed compression spring being in said extended configuration.

15. The valve system, according to claim 11, wherein said proximal spring end engages said spring sleeve, said spring sleeve abuts said sleeve stop, and said distal spring end engages said retainer, in said locked configuration, said closing compression spring being in said compressed configuration.

16. A method for actuating an engine shut-off valve system, the method comprising the steps of:
assembling a housing, a gate member, a rotating lever, a locking piston assembly, and a closing piston assembly, according to claim 1;
installing said passageway in fluid connection with a flow line;

passing an air flow through said flow line and said passageway with said gate member in said locked configuration; and stopping said air flow through said passageway with said gate member in said closed configuration.

17. The method for actuating, according to claim 16, further comprising the steps of:

rotating said gate member at said pivot point with said rotating lever from said closed configuration to said locked configuration.

18. The method for actuating, according to claim 17, wherein said locking piston is comprised of a head portion, a chamfer aligned with said gate latch, and a stop member mounted on said head portion, said chamfer in removable engagement with said gate latch, said stop member being in friction fit engagement with said cylinder, said stop member holding rotational position of said spindle around said spindle axis relative to said cylinder, the method further comprising the steps of:
engaging said chamfer with said gate latch;
rotating said gate latch past said chamfer; and
locking said gate latch against said head portion for friction fit engagement of said locking piston with said gate member.

19. The method for actuating, according to claim 16, wherein said closing piston assembly further comprises a rotating lock nut mounted around said clevis on said distal spring end, the method further comprising the steps of:
setting a position of said rotating lock nut relative to said clevis so as to adjust strength of said closing compression spring.

20. The method for actuating, according to claim 19, wherein said closing chamber further comprises an end cap and a plurality of end cap screws, said end cap screws attaching said end cap to said housing, the method further comprising the steps of:
opening said end cap; and
accessing said rotating lock nut.

\* \* \* \* \*